United States Patent Office 2,718,500
Patented Sept. 20, 1955

2,718,500

RUST INHIBITED COMPOSITION

Harry W. Rudel, Roselle Park, and Marion Gargisa, Elizabeth, N. J., assignors to Esso Research and Engineering Company, a corporation of Delaware No Drawing. Application November 29, 1951,
Serial No. 258,982

14 Claims. (Cl. 252—46.6)

The present invention relates to rust inhibiting compositions and particularly to hydrocarbon oil compositions containing a synergistic combination of rust inhibitors in very small but effective proportions.

In the prior art various attempts have been made to rust inhibit hydrocarbons, especially hydrocarbon lubricating oils, fuel oils, and the like, by incorporating therein certain surface active agents. Some of these materials have been quite satisfactory but, generally speaking, it has been necessary to use them in fairly large proportions and most of them are relatively expensive. The present invention is based on the discovery that very small proportions of certain synergistic materials may be highly effective for the purpose. They may be used in liquid oil compositions such as gasolines, kerosenes, fuel oils, lubricating oils, and the like, or in the solid or semi-solid petroleum products such as petrolatum, waxes, asphalts, greases, and the like. In general, proportions as small as 0.0005 up to 1% of the active agents are used, preferred proportions being from 0.001 up to about 0.1% by weight, based on the total composition.

The synergistic agents referred to above are respectively alkylmercapto acetic acid and acid esters of a phosphorus acid. Both of these should be so chosen as to be at least moderately oil soluble in the very small proportions used. The phosphorus acid should contain at least one hydrocarbon group having not less than 3, nor more than about 20 carbon atoms and preferably between about 8 and 16 carbon atoms. The phosphorus acid may be either phosphoric or phosphorous acid and may contain either one or two of such groups, two being somewhat preferable. The thiophosphorus acids may be substituted for the oxygen bearing acids, if desired, although the latter are somewhat preferable. Examples of suitable phosphorus-containing acids are mono-lauryl phosphoric acid, di-octyl phosphoric acid, di-2-ethylhexyl phosphoric acid, dilauryl phosphorous acid, mono- and di-cresyl phosphoric acid, mono-octyl mono-phenyl phosphoric acid, di-butyl phosphoric acid, mono-octadecyl phosphoric acid, dimethylcyclohexyl phosphoric acid, etc. These acids or acid esters can be derived from the reaction product of a phosphorus oxide, phosphorus chloride or oxychloride with an aliphatic or naphthenic alcohol or a phenol.

The mercapto acetic acid is preferably a lauryl mercapto acetic acid although other alkyl mercapto acid compositions having between about 8 and 20 carbon atoms in the hydrocarbon group may be used.

Neither of the agents referred to above is greatly effective as a rust inhibitor when used alone in low concentrations. For example, in one test which will be mentioned below, a quantity of 0.004% of either of the acids alone in aviation gasoline showed inadequate inhibition where heavy rusting occurred, while a combination of 0.002% of each of both such agents was entirely effective in preventing rusting.

The invention will be more clearly understood by referring to specific examples.

EXAMPLE I

A lauryl mercapto acetic acid was prepared by the following procedure: A solution of 252 g. of sodium hydroxide in 500 cc. of water was added slowly with stirring to a solution of 631 g. of luaryl mercaptan in 1000 cc. of isopropyl alcohol. A solution of 312 g. of monochloroacetic acid in 500 cc. of water was then added to the mercaptan solution dropwise with agitation. The reaction temperature was maintained between 20–25° C. by means of external cooling. During this reaction 500 cc. more of isopropyl alcohol and 1250 cc. more water were added to maintain the reaction mixture in a fluid condition. After the addition was complete the reaction mixture was stirred for an additional one hour at room temperature and two hours at 75° C.

After standing overnight, 300 cc. of concentrated hydrochloric acid were added. The free lauryl mercapto acetic acid thus formed was separated from the heated reaction mixture (free acid is a solid at room temperature) and washed three times with hot water. The product was then filtered hot and dried at 110° C. by blowing with nitrogen. 658 g. of the product was obtained, analyzing 11.37% sulfur and having a neutralization number of 154.4 mg. KOH per gram.

EXAMPLE II

A dioctyl phosphoric acid was prepared by the following procedure:

Phosphorous pentoxide (66 g.) was added portionwise with stirring to 260 g. of octyl alcohol (synthesized by the "Oxo" process). The reaction was highly exothermic and the reaction temperature rose from room temperature to 79° C. during the addition. The product, an amber colored liquid, was heated to 140° C. and blown with nitrogen for four hours to expel the water formed during the reaction. 256.0 g. of product were obtained having a neutralization number of 288.6 mg. KOH per gram.

EXAMPLE III

Mono lauryl phosphoric acid was prepared by a method similar to that employed above. The resulting product had a neutralization number of 346.8 mg. KOH per gram.

EXAMPLE IV

Dilauryl phosphoric acid was prepared exactly as in the previous examples except that a sufficient quantity of the lauryl alcohol was used to form the di-ester. The resulting product had a neutralization number of 173.4 mg. of KOH per gram.

The various products of Examples I to IV were tested separately and in combination in 115/145 aviation gasoline containing 4.6 cc. of tetraethyl lead. The results of these tests are collected in Table I.

Table I.—*Synergistic effect of alkyl mercapto acid and dialkyl phosphoric acid*

| Additive (Weight Percent) | | Extent of Rusting [1] | |
|---|---|---|---|
| Lauryl Mercapto Acetic Acid, Percent | Dioctyl Phorphoric Acid, Percent | Water Phase | Oil Phase |
| 0.004 | -------- | Very heavy | Heavy. |
| 0.003 | 0.001 | Light | Very light. |
| 0.002 | 0.002 | None | None. |
| 0.001 | 0.003 | Trace | Trace. |
| ------ | 0.004 | Light | Heavy. |
| ------ | -------- | Very heavy | Do. |

[1] Mild steel strip stored for 66 days at room temperature in gasoline containing 10% synthetic sea water.

It will be noted from the data in Table I that synergism is obtained when the additives are employed in ratios of from 1/3 to 3/1.

A number of tests were conducted to determine the effect of molecular weight, or extent of esterification, on the rest preventing characteristics of the additives separately and in combination. These results are collected in the following table.

Table II.—*Effect of molecular weight of alkyl phosphoric acid in combination with alkyl mercapto acetic acid*

[Blends in 115/145 Aviation gasoline+4.6 cc. T. E. L.]

| Additive (Weight Percent) | Extent of Rusting [1] | |
|---|---|---|
| | Water Phase | Oil Phase |
| 0.002% Lauryl Mercapto Acetic Acid+ 0.002% Mono Lauryl Phosphoric Acid. | Light | None. |
| 0.004% Mono Lauryl Phosphoric Acid | Very heavy | Very heavy. |
| 0.002% Lauryl Mercapto Acetic Acid+ 0.002% Dilauryl Phosphoric Acid. | Trace | None. |
| 0.004% Dilauryl Phosphoric Acid | Very heavy | Very heavy. |
| 0.002% Lauryl Mercapto Acetic Acid+ 0.002% Dioctyl Phosphoric Acid. | None | None. |
| 0.004% Dioctyl Phosphoric Acid | Light | Light. |
| 0.004% Lauryl Mercapto Acetic Acid | Medium | None. |
| No additive | Very heavy | Heavy. |

[1] Mild steel strip stored for 33 days at room temperature in gasoline containing 10% synthetic sea water.

EXAMPLE V

A particularly severe requirement for rust inhibitors occurs in turbine lubricating oils. A composition was prepared using a light turbine oil of about 43 S. S. U. viscosity containing a conventional anti-oxidant in proportions of 0.4% by weight. The anti-rust additive was a combination of 0.0075% of lauryl mercapto acetic acid and a similar quantity of di-octyl phosphoric acid. This turbine oil product was subjected to the standard ASTM tests both in distilled water and in sea water. The oil composition passed both tests successfully, no rusting having occurred. When proportions of each of the additives were reduced to 0.005%, however, the oil failed to pass the seawater test although it still passed the distilled water test. This appears to indicate that, for turbine oil use particularly, the latter proportions are about the lowest useful limit, and it is preferable to use slightly more than 0.005% of each of the additives for such service. When employed alone, 0.03 weight % of lauryl mercapto acetic acid is required to inhibit sea water corrosion. This is four times the quantity used in Example V.

In general, depending upon the particular use and the particular tendency toward rusting, proportions of 0.00025 to 0.5% of each additive may be used in the hydrocarbon vehicle. The narrower range of 0.005 to about 0.05% of each of the additives is preferred. It is not necessary that equal quantities of the two being used, but it is generally preferred that they be used in approximately the same proportions. Proportions should normally be within the ratio limits of about 3/1 to 1/3, as suggested above.

It will be understood that these additives may be combined with other conventional additives in petroleum vehicles. Thus, in gasolines, fuel oils, and the like, they may be combined with anti-oxidants, sludge dispersers, etc., and in lubricants they may be combined with viscosity improving agents, pour point depressants, antioxidants, metal deactivators, extreme pressure additives and various other conventional type modifiers.

What is claimed is:

1. A rust inhibited composition comprising a major proportion of a hydrocarbon, 0.00025 to 0.5% by weight, based on the total composition, of an oil soluble acid ester of a phosphorus acid containing at least one hydrocarbon radical of 3–20 carbon atoms and 0.00025 to 0.5% of an alkyl mercapto acetic acid having about 8–20 carbon atoms in the alkyl group, the total amount of said ester and alkyl mercapto acetic acid being sufficient substantially to inhibit rusting by said hydrocarbon.

2. A rust inhibited composition comprising a major proportion of a liquid hydrocarbon, 0.00025 to 0.5% by weight, based on the total composition of an acid ester of a phosphorus acid containing from 3 to 20 carbon atoms and 0.00025 to 0.5 of a $C_6$ to $C_{20}$ alkyl mercapto acetic acid, the total amount of said ester and alkyl mercapto acetic acid being sufficient substantially to inhibit rusting by said hydrocarbon.

3. Composition according to claim 1 wherein the ester is a dialkyl phosphoric acid.

4. Composition according to claim 1 wherein the alkyl group of the alkyl mercapto acetic acid has 8 to 16 carbon atoms.

5. Composition according to claim 2 wherein the phosphorus acid ester contains at least one lauryl group.

6. Composition acocrding to claim 2 where the ester is an ester of phosphoric acid.

7. Composition according to claim 2 wherein the mercapto acid is a $C_8$ to $C_{16}$ alkyl mercapto acetic acid.

8. Composition according to claim 2 wherein the mercapto acid is a lauryl mercapto acetic acid.

9. A rust inhibited composition comprising a major proportion of a mineral base oil, 0.0005 to 0.05% by weight, based on the total composition, of $C_8$ to $C_{16}$ alkyl mercapto acetic acid and 0.0005 to 0.05% of $C_6$ to $C_{20}$ alkyl phosphoric acid, the total amount of said alkyl mercapto acetic acid and alkyl phosphoric acid being sufficient substantially to inhibit rusting by said mineral base oil.

10. Composition according to claim 9 wherein the phosphoric acid is a dioctyl phosphoric acid.

11. Composition according to claim 9 wherein the phosphoric acid contains at least one lauryl group.

12. Composition according to claim 9 wherein the phosphoric acid is a dilauryl phosphoric acid.

13. Composition according to claim 9 wherein the mercapto acid is lauryl mercapto acetic acid.

14. A rust inhibited lubricating oil comprising a major proportion of mineral base lubricating oil, about 0.0075% by weight, based on the total composition, of lauryl mercapto acetic acid, and about 0.0075% of dilauryl phosphoric acid.

References Cited in the file of this patent

UNITED STATES PATENTS

| 2,285,854 | Downing et al. | June 9, 1942 |
| 2,477,356 | Wayo | July 26, 1949 |